United States Patent [19]

Schröder et al.

[11] Patent Number: 5,784,652
[45] Date of Patent: Jul. 21, 1998

[54] MODULAR CAMERA WITH CASSETTE CHAMBER ACCESSIBLE THROUGH OUTERBODY

[75] Inventors: Rolf Schröder, Zorneding/Pöring; Peter Lermann, München; Dieter Engelsmann, Unterhaching; Claus Steiner, Mindelheim; Jörg Heidrich, Dessau; Hermann Lührig, Leverkusen; Paul Kopf, Unterhaching; Julian Schlagheck, München, all of Germany

[73] Assignee: AGFA Gevaert Aktiengesellschatt, Germany

[21] Appl. No.: 778,877

[22] Filed: Jan. 2, 1997

[30] Foreign Application Priority Data

Jan. 5, 1996 [DE] Germany ............ 196 00 269.9

[51] Int. Cl.[6] .................................................. G03B 17/02
[52] U.S. Cl. ........................................... 396/6; 396/541
[58] Field of Search ........................ 396/6, 535, 536, 396/538, 541

[56] References Cited

U.S. PATENT DOCUMENTS

| 5,063,400 | 11/1991 | Takei et al. | 396/6 |
| 5,146,255 | 9/1992 | Nakai et al. | 396/6 |
| 5,581,321 | 12/1996 | Boyd | 396/535 |

FOREIGN PATENT DOCUMENTS 0 679 929 A1  11/1995  European Pat. Off. .

*Primary Examiner*—Howard B. Blankenship
*Attorney, Agent, or Firm*—Connolly & Hutz

[57] ABSTRACT

A camera for roll film which can be wound into a film cassette has a central subassembly forming a light-tight inner body in which a film cassette chamber which receives the film cassette is contained and in which a film guidance device is contained, and has an outer body which surrounds the central subassembly, wherein the film cassette chamber of the central subassembly can be closed by a removable cassette chamber cover which is accessible through an opening in the outer body.

13 Claims, 5 Drawing Sheets

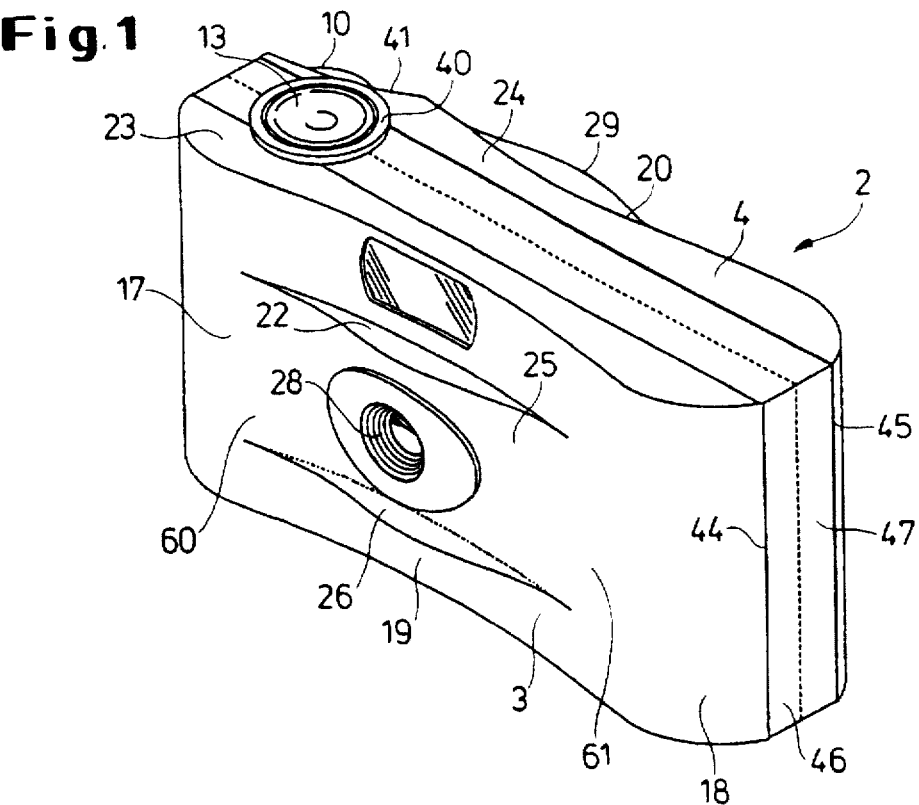
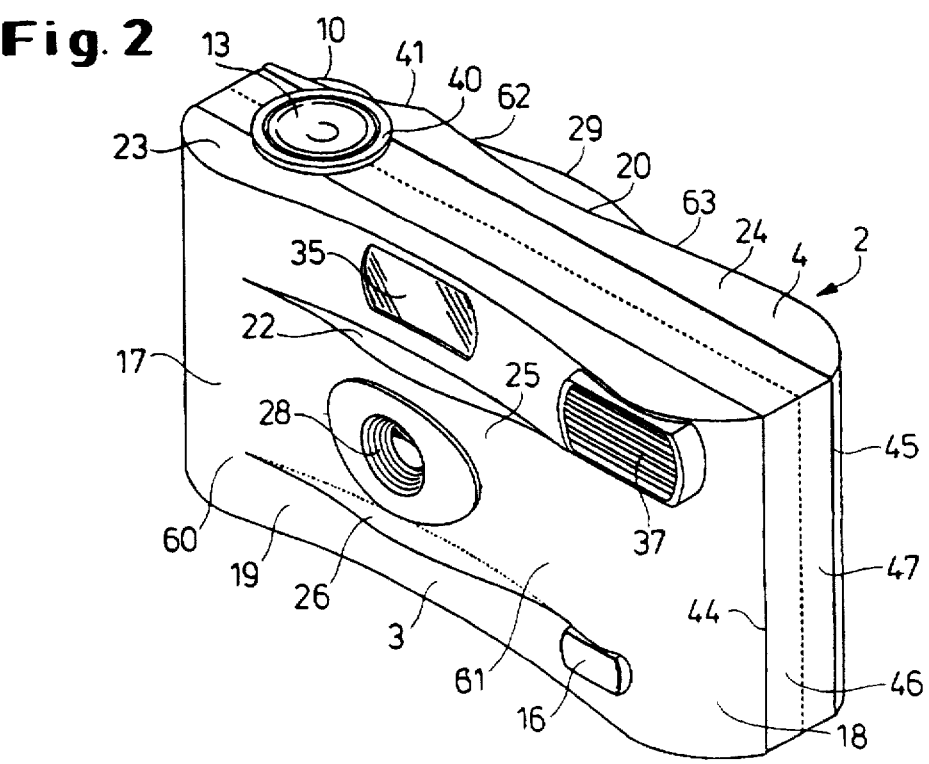

MODULAR CAMERA WITH CASSETTE CHAMBER ACCESSIBLE THROUGH OUTERBODY

The invention preferably relates to what is termed a disposable camera, which is packaged by the manufacturer with a roll film serving as a recording material before delivery to the trade and which reaches the final purchaser via the trade in this packaging ready for use. The final purchaser can use it straight away for taking photographic pictures corresponding to the number of picture sections or frames provided on the roll film. Thereafter he delivers the entire camera with the exposed film contained therein to a developing organisation, where after its removal from the camera the film is developed and further processed. When the developed film and the copies of the pictures which are produced therefrom are returned, the camera, which is now without a film, is not returned to the customer, but is returned in the form of its parts by the developing organisation to the manufacturer concerned, provided that a check of the parts returned confirms the suitability for reuse of the camera which is to be re-packaged. Otherwise, camera parts which are no longer suitable for reuse are fed to a recycling process. For the further or subsequent taking of photographs, however, the camera user acquires a new or reconditioned camera when required, which has again been packaged with unexposed film by the manufacturer.

Therefore, when using cameras of this type, the user has no dealings either with inserting an unexposed film in the camera or with the removal of the exposed film from the camera. From the user's point of view, a camera of this type is therefore described as a "disposable camera" or as a "film with lens", since it primarily constitutes a film cassette which is equipped with functions for frame by frame exposure and for advancing the film frame by frame, and is therefore augmented in this respect to form a camera. As explained above, however, the term "disposable camera" does not rule out the reuse of parts of it at least, after its return to the manufacturer, in the assembly of new cameras of the same mode of construction.

For economic reasons, disposable cameras of this type have to be fashioned in a comparatively simple manner and have to be inexpensive to manufacture. In this connection it is known that elements which are essential to the operation of the camera, namely for the spatial accommodation of the film and for film guidance and film advance, and also the photographic shutter for the frame by frame exposure of the film, can be concentrated in a central subassembly forming a light-tight inner body, and that the latter can be surrounded by a relatively simple casing which consists of plastic or even simply of cardboard in parts.

It is known from the document DE 4 414 854 A1 that the central subassembly can be surrounded by an outer body assembled from two approximately symmetrical plastic shells, and that the two body shells can be locked, adhesively bonded or joined to each other in a joined-together position by means of a surrounding connecting band.

When cameras of this type are delivered by the user, after the frame by frame exposure of the film contained therein, to the developing organisation entrusted by him with developing the film, the outer body has to be opened there in order to remove the film from the camera, frequently by breaking open the latter. This operation and the manipulation, which is associated therewith, of the components of the camera which arise when the body is opened, necessitate a not inconsiderable labour input in the developing organisation concerned.

The underlying object of the present invention is to create a camera, preferably a disposable camera, of the type cited at the outset, which makes it possible to remove the film from a central subassembly constructed as a light-tight inner body without opening the outer body surrounding the central subassembly.

Further forms of the invention follow from the subsidiary claims.

Preferred embodiments of the invention and the advantages associated therewith are described in more detail below with reference to the accompanying drawings.

The drawings are as follows:

FIG. 1 shows the external form of an embodiment of a photographic image recording device according to the invention which is constructed as a disposable camera, as a perspective illustration looking towards the front face;

FIG. 2 shows the external form of a further embodiment of an image recording device of this type according to the invention, as a perspective illustration looking towards the front face;

In FIGS. 1 and 2 and in the following Figures of the drawings, embodiments of a disposable camera according to the invention are illustrated which are essentially identical to each other as regards their basic construction. In practice, they differ from each other simply in that in addition to the components which are present in the embodiment shown in FIG. 1, the embodiment shown in FIG. 2 also comprises a flashlight device which is described in more detail below. Where reference is made in the following description to one of the aforementioned embodiments, the statements made in this respect are also correspondingly applicable to the other embodiment, with the exception of those parts of the description which relate to the aforementioned flashlight device.

The external form of the aforementioned embodiments are illustrated in FIGS. 1 to 4. Moreover, as is shown in FIG. 5 in particular, the construction of these embodiments essentially consists of a central subassembly 1 and an outer body 2, which is assembled from two joined-together body shells 3, 4 which are of approximately symmetrical construction and are substantially rigid, and which almost completely surrounds the separate central subassembly 1 on all sides.

The central subassembly 1 will first be described in detail below.

Figure 5:
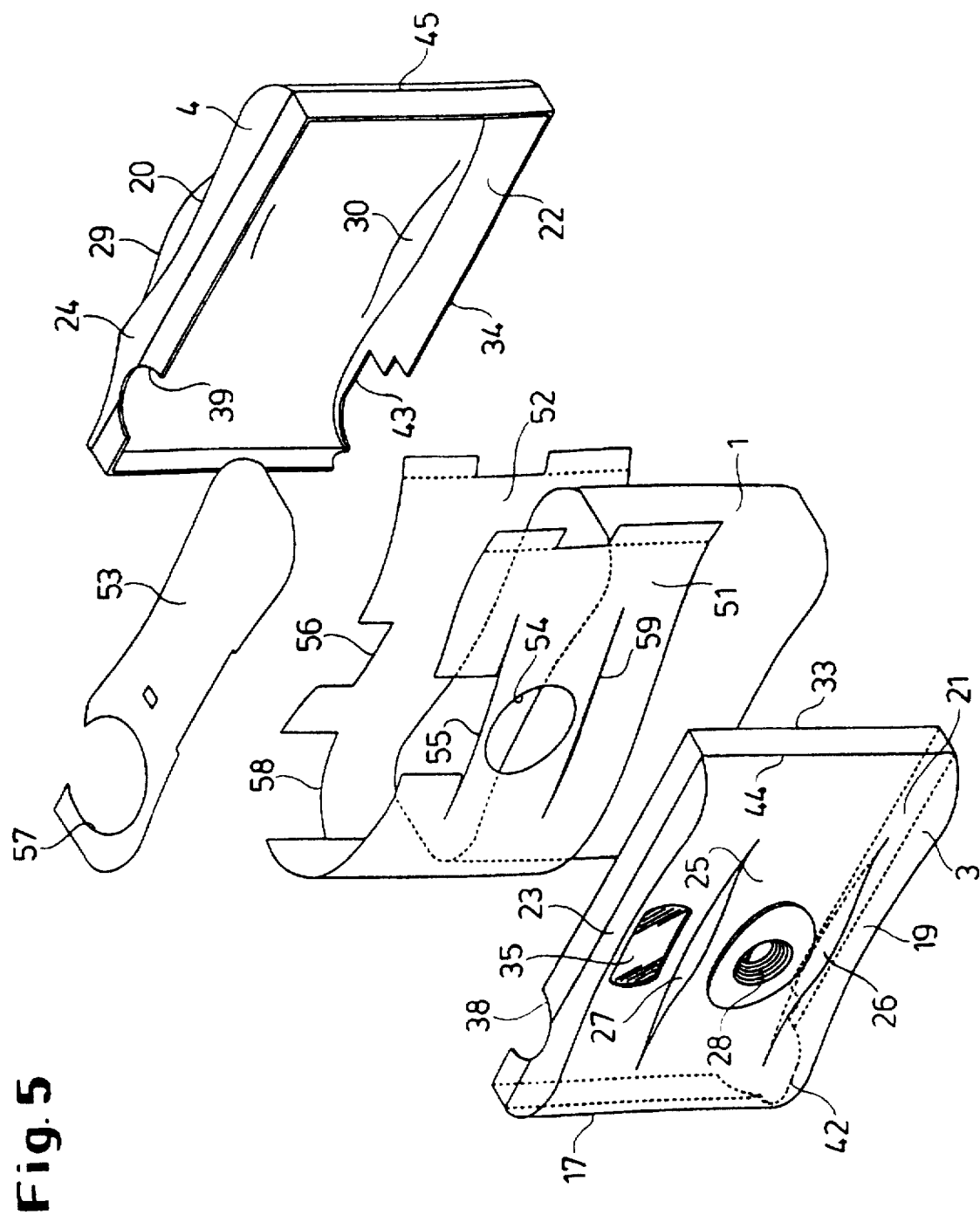
FIG. 5 is an "exploded view" illustration of the camera shown in FIG. 1.
Figure 6:
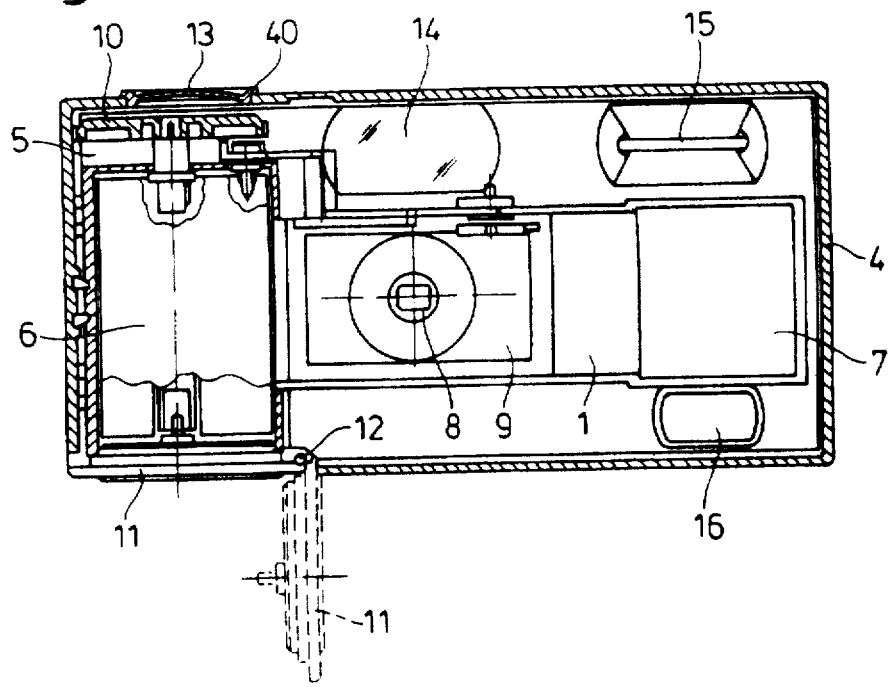
FIG. 6 shows the internal construction of the camera of FIG. 2, as a schematic illustration viewed from the front and with the front body shell removed.
Figure 7:
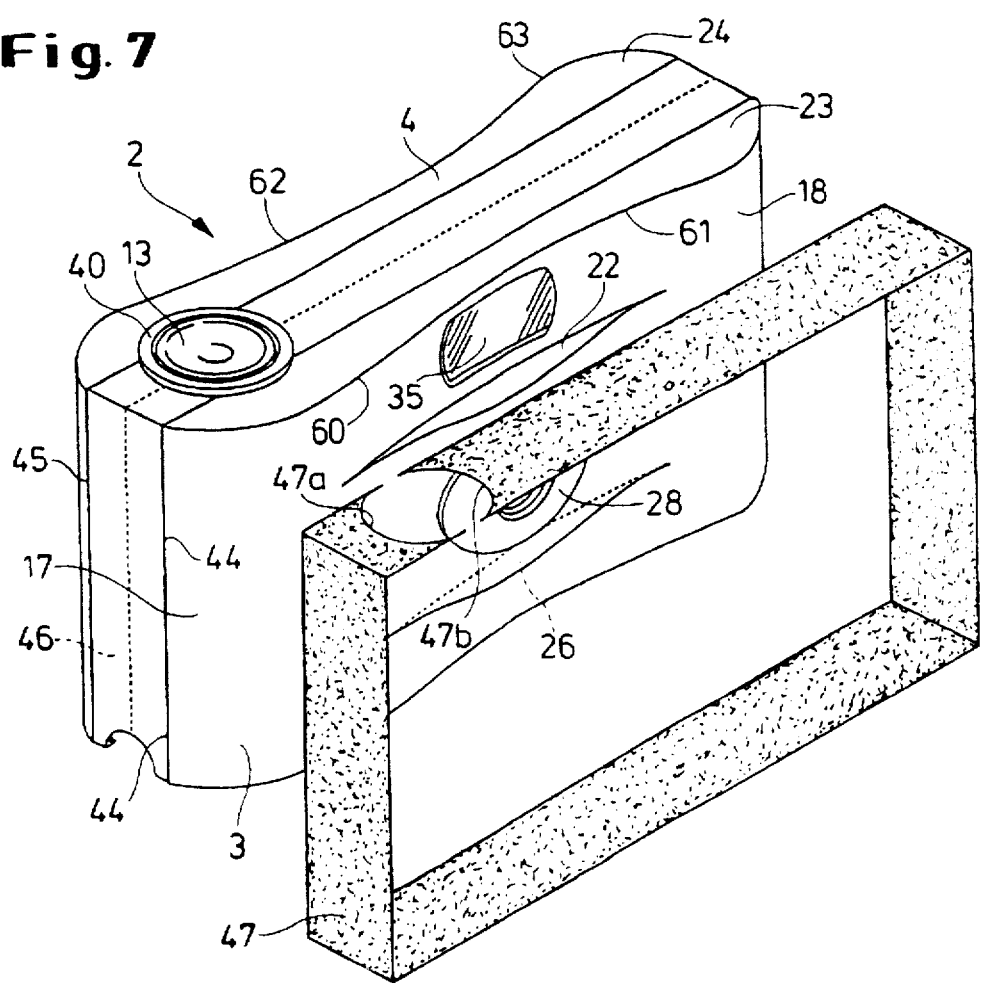
FIG. 7 is an "exploded view" illustration of the subject of FIG. 1 with a surrounding connecting band.

The central subassembly 1, which is merely shown schematically in FIG. 5 and which is illustrated in detail in FIG. 6, serves to receive a photographic roll film with a corresponding roll film cassette and contains the essential components for frame by frame exposure and the frame by frame advance of the film.

In particular, the central subassembly 1, which forms a light-tight inner body, contains a film cassette chamber 5 for receiving a film cassette 6 in its right-hand end region as seen looking towards the object to be photographed, and contains a film roll chamber 7 for receiving a loose roll of film, which is not illustrated in FIG. 6 or in the other drawings also, in its left-hand region as seen looking towards the object to be photographed. The film cassette 6 is substantially cylindrical, but has a film opening, which protrudes tangentially from its curved surface, for the passage of the film.

Cylindrical film cassettes of this type are frequently also described as film cartridges. The film and the film cassette preferably correspond to a packaging system which has become known in public by the description "advanced photo system" and which is also described in detail, for example, in U.S. Pat. No. 5,251,840. The cross-section of the film cassette chamber 5 is matched to the cross-sectional profile of the film cassette 6.

Figure 3:
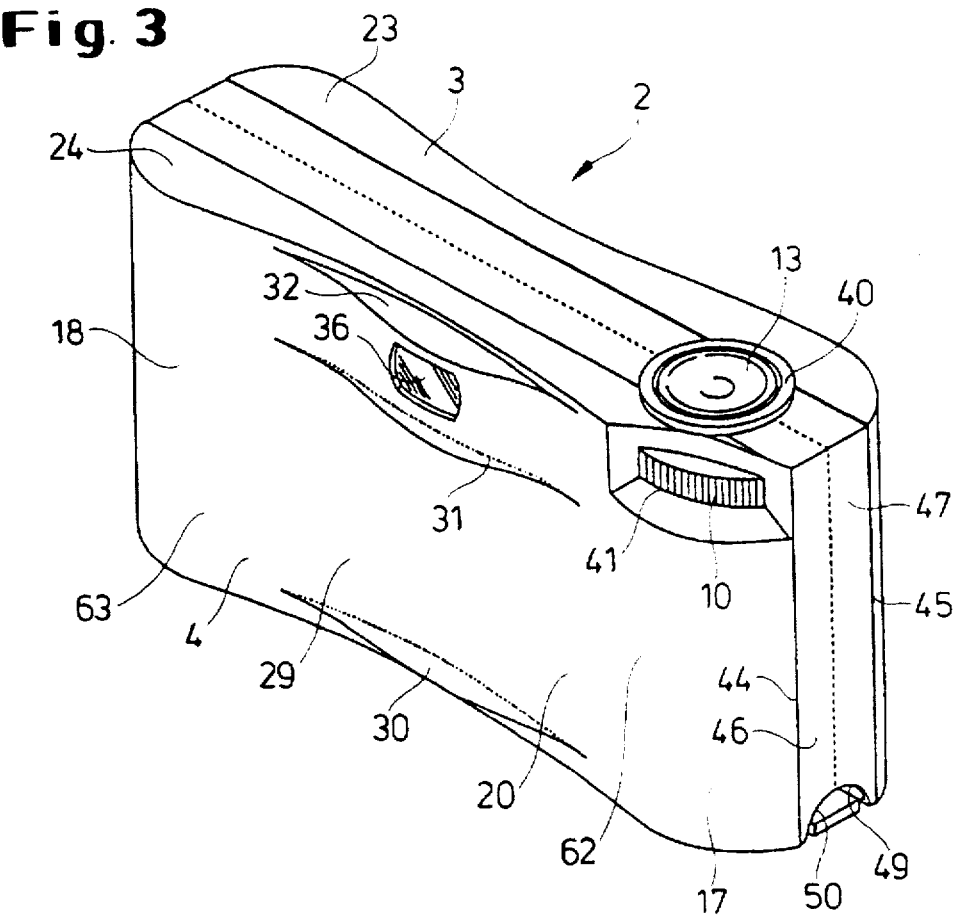
FIG. 3 shows the external form of a camera as shown in FIGS. 1 or 2, as a perspective illustration looking towards the back face.

A film advance device, which is also contained in the central subassembly 1 but which is not illustrated, comprises a knurled, manually operable film advance wheel 10 which is visible in FIG. 3 in particular. It serves to advance the film, frame by frame, from the film roll chamber 7, past an image aperture 9 which is described in detail below, to the film cassette 6. For this purpose, when the film cassette is inserted in the film cassette chamber 5 a film spool, which is rotatably mounted in the film cassette 6 but which is not illustrated, is coupled to the film advance wheel 10 in a manner which is not illustrated. For counting the frames, a frame counting disc, which is known in the art and which is likewise not described in detail, is also provided on the central subassembly 1. This frame counting disc is connected to and driven by the aforementioned film advance device and is adjusted in steps by the film advance device for counting the frames, in unison with the step-wise film advance from frame to frame between successive photographic recordings.

Figure 4:
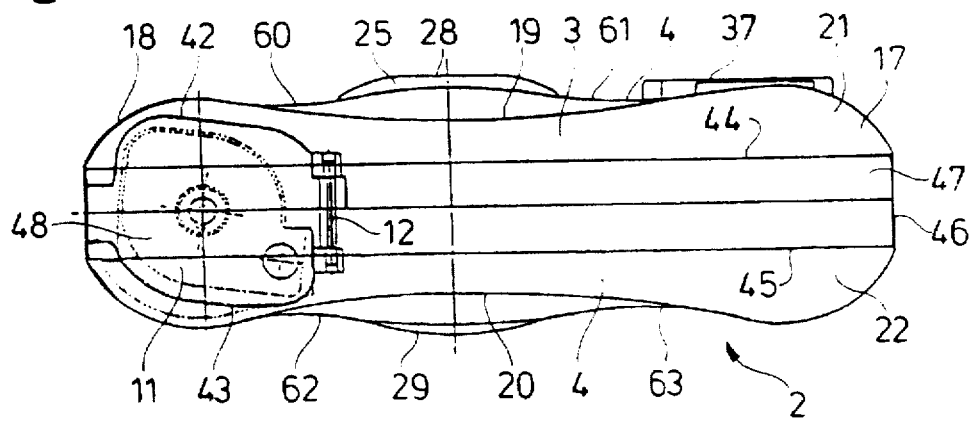
FIG. 4 shows the external form of the camera illustrated in FIG. 2, as a view from below.

The film cassette 6 can be inserted in the film cassette chamber 5 of the central subassembly from below when a substantially flat cassette chamber cover 11 on the bottom, which cover is approximately round and which corresponds to the cross-sectional profile of the film cassette chamber 5, is swivelled about a hinge 12 provided on the central subassembly 1, from its closed position shown by the full lines in FIG. 6 into the open position shown by the dashed lines in FIG. 6. FIG. 4 shows the cassette chamber cover 11, in a view from below, in its closed position, in which it blanks off the film cassette chamber in a light-tight manner by means of a labyrinth seal or a felt ring (not illustrated), with the formation of a press fit at the bottom edge of the film cassette chamber 5, so that ambient light from the outside cannot enter the film cassette chamber 5 and thus cannot enter the other internal space of the central subassembly 1.

In addition, a shooting lens is provided on the central subassembly 1; it consists of one or more lenses and is preferably provided with an aspherical lens surface. The image aperture 9, which forms a film advance track in the interior space of the central subassembly 1, which is constructed as a light-tight inner body, is situated behind the shooting lens between the film cassette chamber 5 and the film roll chamber 7. As seen from the lens 8, the film advance track preferably has a slight concave curvature towards the back so as to obtain a simpler correction of its image distortion effects.

The central subassembly 1 also comprises a photographic shutter which is not illustrated but which is disposed on the optical axis of the shooting lens 8. The shutter has a shutter release device which is connected to a manually operable shutter release button 13, which is described in more detail below.

Furthermore, the central subassembly 1 comprises the object-side lens 14 of a viewfinder.

In the embodiment shown in FIG. 2, the central subassembly 1 also comprises an electronic flash device. FIG. 2 only shows the flashlight source 15 and a manually operated switch 16 for switching on a charging device, which is not illustrated, for charging a charging capacitor, which is likewise not illustrated, of the flash device.

The outer body 2 with the body shells 3,4, which receives and surrounds the central subassembly 1, is described in more detail below.

When the two body shells 3, 4 of the body 2, which are each illustrated individually in FIG. 5, are joined to each other in the position shown in FIGS. 1 to 4, they jointly form right and left end regions 17, 18 of the body 2 as seen looking towards the shooting lens. The two body end regions 17, 18 each form sections of approximately cylindrical curved surfaces at their periphery, and their axial length and their diameter are dimensioned so that they can receive and surround, in their interior, the right and left end regions of the central subassembly 1 with the film cassette chamber 5 for receiving a film cassette 6 and with the film roll chamber 7 for receiving a film roll, respectively.

Between the two lateral body end regions 17, 18 the body shells 3, 4 each have approximately concave cylindrical outer body faces 19, 20, the cylinder axes of which are each parallel to the cylinder axes of the body end regions 17, 18. However, the radii of curvature of these concave cylindrical front and back body faces 19, 20 of the body shells 3, 4 are substantially larger than the radii of curvature of the cylindrical end regions 17, 18 of the body 2. In the direction of the respective cylinder axis, these body faces 19, 20 each extend from a flat bottom part 21, 22 respectively, to a flat top part 23, 24 respectively, of the body shells 3, 4. The bottom parts 21, 22 and the top parts 23, 24 each form half of the bottom and the top outer face of the body, respectively, when the body shells 3, 4 are placed on each other.

The concave cylindrical faces 19, 20 of the front and back body shells 3, 4, respectively, are each curved towards the inside of the body 2, so that the top and bottom edges of the body faces 19, 20 of both body shells 3, 4 each jointly form an approximately biconcave contour, as can be seen from FIG. 4 in particular. The bending edges of the bottom parts 21, 22 and of the top parts 23, 24 of the body 2 therefore form an identical biconcave contour.

A body projection 25, which is convex and is curved outwards towards the front in the direction of the shooting lens, protrudes from the concave cylindrical body face 19 of the front body shell 3 in the direction of the optical axis of the shooting lens 8. This body projection forms lower and upper step faces 26, 27 towards the body face 19, which extend in planes parallel to the axis of the shooting lens 8. The body projection 25 has an approximately centrally disposed opening in which an approximately conical, furrowed tube body 28 is inserted, and is preferably clipped therein. The shooting lens 8 of the central subassembly 1 is disposed closely behind the tube body when the assembly of the camera is complete, so that a larger gap does not arise between the tube body 28 and the lens of the shooting lens 8 which is disposed behind it, and thus even when the camera is used on the beach, for example, the entry of sand or other foreign bodies is substantially prevented.

In a similar manner, a body projection 29, which is convex and is curved toward the back, likewise protrudes from the concave cylindrical body face 20 of the back body shell 4 in the direction of the optical axis of the shooting lens 8. This body projection likewise forms lower and upper step faces 30, 31 and a further step face 32 with the body face 20, and it serves on the inside to receive the film track, which is curved towards the back and which is determined by the image aperture 9 of the central subassembly 1.

The front and back body projections 25, 29 are preferably in one piece with the associated body shells 3, 4 and are likewise of substantially rigid construction. The body projections 25, 29 are therefore integrated within the associated body shells 3, 4. In the assembled state, the body projections 25, 29 of the front and back body shells 3, 4 are approximately symmetrical to each other, and the mutually abutting surrounding edges 33, 34 of the two body shells 3, 4 form a plane of symmetry oriented perpendicularly to the optical axis of the shooting lens 8 when they are joined together, which plane of symmetry approximately halves the bottom and top faces of the body along the length of each.

The front body shell 3 forms a plane-parallel plate 35 behind which the viewfinder lens 14 of the central subassembly 1 is situated. Moreover, the back body shell 4 forms a viewfinder eyepiece 36, which lies on the optical axis of the viewfinder lens 14, in the thicker, curved portion of the body projection 29 which is present between the step faces 31, 32.

In addition, in the embodiment shown in FIG. 2 the front body shell 3 also forms a diffusing lens 37 which is situated in front of the flashlight source 15 of the central subassembly 1, and also forms an aperture for the passage of the charging switch 16 of the flash device, which switch is present on the central subassembly 1.

For simplicity of mounting of the manually operated shutter release button 13 which is provided on the top side of the camera, the edges 33, 34 of the body shells 3, 4 each have reliefs 38, 39 in the shape of half-moons in the opposite regions of the top parts 23, 24. These reliefs together form a circular opening and fit in a surrounding mounting ring 40 of the release button 13. In addition, the back body shell 4 has a slot-shaped opening 41 though which part of the film advance wheel 10 of the central subassembly 1 protrudes towards the outside.

The body shells 3, 4 also have reliefs 42, 43 on their undersides on opposite sections of their edges 33, 34, which reliefs jointly form an opening 42-43 on the bottom of the body 2 in which the cassette chamber cover 11 is situated when the assembly of the camera is complete. On account of the relatively large dimensions of the cassette chamber cover 11, these reliefs 42, 43 are likewise relatively large and extend as far as the vicinity of each of the adjacent bending edges of the bottom parts 21, 22 of the two body shells 3, 4. However, these bending edges follow the concave profile of the body faces 17, 18 of the respective body shells 3, 4. The consequence of this is that the bottom faces of the two bottom parts 21, 22 of the body shells 3, 4 are reduced in the vicinity of the opening 42-43 to an approximately sickle-shaped, diametrically outwardly curved form. Despite their narrowness, these sickle-shaped sections of the bottom parts 21, 22 are sufficiently mechanically stable because they are integrally formed on the surrounding parts of the body shells 3, 4.

The cassette chamber cover 11 of the film cassette chamber 5 protrudes downwards in the manner of a step on the underside of the central subassembly 1, so that when the body shells 3, 4 are placed on the central subassembly 1 the cassette chamber cover 11 which is fixed to the latter is located in the opening of the body 2 which is formed by the reliefs 42, 43 of the body shells 3, 4, without being covered by the body shells 3, 4. The outer body 2 therefore leaves the cassette chamber cover 11 of the central subassembly 1 free, so that it is accessible from the outside. The cassette chamber cover completes the bottom face of the camera which is formed by the bottom parts 21, 22 of the body shells 3, 4. When the assembly of the camera is complete, the edge of the cassette chamber cover 11 in its closed position terminates approximately flush with the bottom of the body formed by the bottom parts 21, 22 of the body shells 3,4. When the cassette chamber cover 11 is opened to remove the film, it is not obstructed by the body shells 3, 4.

Due to the mode of construction described above, the body shells 3, 4 can be pushed on to the central subassembly 1 from the front and from the back, respectively, and fixed to the latter during the assembly of the camera by the manufacturer, wherein the slot-shaped opening 41 in the back body shell 4 is capable of receiving the film advance wheel 10 of the central subassembly 1, whilst after inserting half the mounting ring 40 of the shutter release button 13 in the half-moon shaped relief 38 of the front body shell 3 the half-moon shaped relief 39 of the back body shell 4 can engage in the half of the circumference of the mounting ring 40 of the release button 13 which is still free, whereby the release button 13 is mounted in the opening in the top part of the body 2 formed by the reliefs 38, 39. At the same time, the sickle-shaped sections of the bottom parts 21, 22 of the body shells 3, 4, which sickle-shaped sections complement each other to form a ring, surround the cassette chamber cover 11 with the formation of the opening 42-43. This results in the assembly of the camera being particularly simple. Suitable supporting elements, such as supporting ribs for example, which are not illustrated in the drawings, are provided on the central subassembly 1 and/or on the inner faces of the body shells 3, 4 for the accurate mounting of the central subassembly 1 inside the body 2 formed by the joined-together body shells 3, 4.

Near their edges 33, 34 the body shells 3, 4 each have surface gradations 44, 45, which together form a surrounding channel 46 when the body shells 3, 4 are joined together. The shell regions between the respective edges 33, 34 and the gradations 44, 45 are flat, so that in the region of the channel 46 the body 2 at the same time forms a surrounding frame with flat frame faces, which increases the mechanical stability of the outer body 3, 4 formed by the body shells 3, 4. A surrounding, strip-shaped connecting band 47, which is illustrated separately in FIG. 8, is inserted in the channel 46. This connecting band consists of flexible material; it attaches and holds together the two body shells 3, 4 in their joined-together position. At the same time, the connecting band 47 contributes to the formation of the surrounding body frame described above. The two free ends 47a, 47b of the connecting band 47 are clamped under the mounting ring 40 of the shutter release button 13 and are thereby fixed and protected from unwantedly being detached or torn open. The connecting band 47 preferably consists of plastic and is constructed either as an adhesive strip or, in departure from the illustration in FIG. 8, as an endless elastic strip which either surrounds the release button 13 in the form of a ring or which makes it possible for the release to be operated through the band if the release button is covered.

The channel 46 formed by the body shells 3, 4 also continues, in an aligned arrangement, over the outer face of the cassette chamber cover 11, so that the connecting band 47 is also guided over the cassette chamber cover 11 and covers the latter in its closed position, as can be seen from FIG. 4. The connecting band 47 thus forms a seal which fits over the cassette chamber cover 11 at opposite edges, which constitutes a protection against the cassette chamber cover 11 being undesirably opened, against the instructions, by the camera user. The risk of any damaging incidence of light in the film cassette chamber 5 of the central subassembly 1 before or during the taking of photographs is thereby reduced or eliminated.

In a further embodiment, which differs from the embodiments illustrated in the drawings, no hinge is provided on the central subassembly 1, so that when the camera is packed the cassette chamber cover 11 is supplied as a loose, separate part and is attached to the bottom edge of the film cassette chamber 6 from the outside with the formation of a press fit.

In all the embodiments described above, in its position which closes the film cassette chamber 5, the cassette chamber cover 11 can be additionally protected from unwanted opening by a sealing patch (not illustrated) which can preferably be stuck on from the outside. This can fit all round the edges of the cassette chamber cover 11 and can also partially cover the sickle-shaped sections of the bottom parts 21, 22 of the body shells 3, 4. A sealing patch of this type may also be integrally formed on the surrounding connecting band 47 and may be in one piece with the latter. The aforementioned sealing patch can also assume the function of providing a light-tight seal between the film cassette chamber 5 and the cassette chamber cover 11, so that a special labyrinth seal between the film cassette chamber 5 and the cassette chamber cover 11 can be dispensed with.

The connecting band 47 and/or the sealing patch for the cassette chamber cover 11 can also assume the function of the hinge 12 for swinging open the cassette chamber cover 11 when the film cassette chamber 6 is opened, so that the mechanically constructed hinge 12 can also be dispensed with.

On account of their concave cylindrical curvature towards the inside of the camera in the sections on both sides of the optical axis of the shooting lens 8 between the body end regions 17, 18 and the flanks of the body projections 25, 29 which are oriented towards these end regions, the front and back faces 19, 20 of the body shells 3, 4 each form indentations 60, 61, 62, 63, which are deeper than these body end regions. Right and left recessed grips are thereby formed on the camera body 2, both on the front face and on the back face in each case, so that the two lateral end regions of the camera can each be grasped well and securely by the user with both hands. In the embodiments described above, the advantages cited in the introduction as regards secure manipulation of the camera even in difficult conditions for taking photographs are thereby ensured. In addition, the embodiments described above are also protected from the ingress of sand and spray water when used on the beach or during sport, and are also protected from unfavourable weather conditions and from becoming soiled.

Instead of the concave cylindrical surface profiles described above, rounded profiles or edge-forming profiles which differ therefrom can also be provided in order to form the indentations 60, 61, 62, 63 described above on the front and back body faces 19, 20 on both sides of the shooting lens axis. The section of the body faces 19, 20 which are opposite each other in each case may either be approximately symmetrical with respect to the parting plane which is perpendicular to the shooting lens axis and which is formed by the shell edges 33, 34 of the two body shells 3, 4, as is the case in the embodiments described above, or they may also be unsymmetrical.

Figure 3A:
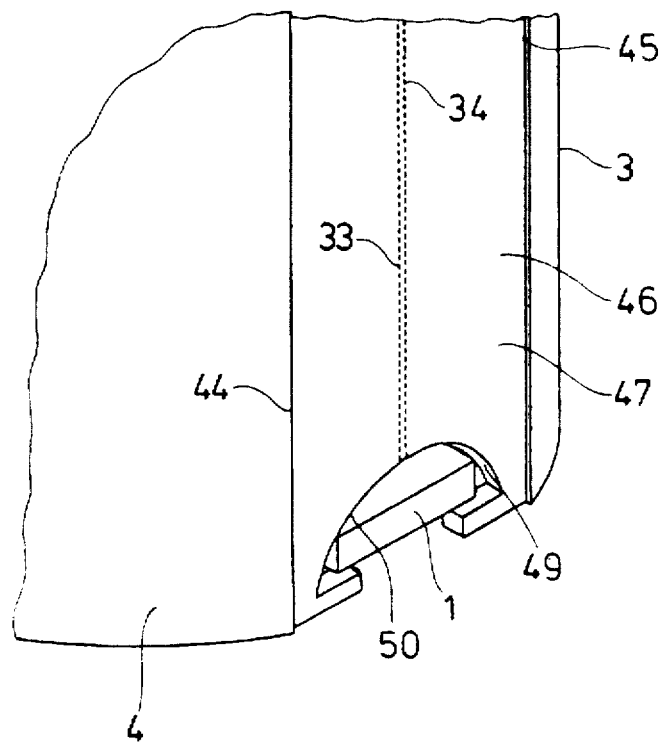
FIG. 3A is an enlarged illustration of part of the subject of FIG. 3.

After the camera has been delivered by the user, when the photographs have been taken, to the delegated developing organisation, the connecting band 47 can be separated there in the region of the cassette chamber cover 11 in order to open the cassette chamber cover 11 of the central subassembly 1 for the removal of the film cassette 6 which is disposed therein. The introduction of a tool which is suitable for this purpose is made easier by openings 49, 50 (FIGS. 3 and 3A) on the body shells 3, 4 in the corner region of the body 2 adjacent to the cassette chamber cover 11. A break off location may also be provided on the connecting band 47 at this point, which makes it easier to tear open the connecting band in the region of the cassette chamber cover 11. If the cassette chamber cover 11 is sealed by a stuck-on patch in the manner described above, the latter is torn off in a similar manner in order to open the same and is thereby intentionally destroyed.

By tearing open the connecting band 47 and/or the sealing patch the cassette chamber cover 11 is exposed on one side at least, so that it can be opened in order to assume the position illustrated by the dashed lines in FIG. 6 or can be removed completely. In this manner the film cassette 6 which is present in the film cassette chamber 5 can be removed from the camera together with the exposed film which is wound stepwise, frame by frame, into the film cassette 6 in the course of the frame by frame exposure, by operating the film advance wheel 10 each time. Since the cassette chamber cover 11 is situated in the opening 42-43 formed by the reliefs 42, 43 of the body shells 3, 4, it can be opened in the manner described above without the body shells 3, 4 having to be wholly or partly detached or removed from the central subassembly 1 and/or from each other.

Instead of the connecting band 47, or in addition thereto, locking means which are not illustrated may be provided along the edges of the body shells 3, 4 in modifications of the embodiments described above. The body shells 3, 4 can be locked to each other in the joined-together position with these locking means. Instead of this, the two body shells 3, 4 may also be adhesively bonded to each other on mutually abutting faces in the joined-together position.

The body shells 3, 4, together with the associated body projections 25 and 29, respectively, are preferably injection moulded from transparent, preferably clear, plastic. The insides of the concave cylindrical body faces 19, 20 of the body shells 3, 4, including the inner faces of the front and back body projections 25, 29, may therefore be covered with flexible inserts 51, 52 which may preferably consist of printed paper or cardboard or of a foil, and which fit tightly against the aforementioned inner faces of the shells. The two inserts 51, 52 may either be cut out separately or may consist of one piece, as is illustrated in a developed view in FIG. 5 for example. The inserts 51, 52, and also an additional insert 53 for placing against the inner faces of the top parts 23, 24 of the body shells 3, 4, have corresponding openings 54, 55, 56 in the region of the shooting lens 8, the viewfinder lens 14 and the viewfinder eyepiece 36, and optionally in the region of the diffusing lens 37, and also have further openings 57, 58 in the region of the operating elements 10, 13, and optionally 16, which protrude outwards from the central subassembly 1.

The body base formed by the bottom parts 21, 22 of the body shells 3, 4 may also be covered inside with an insert which is not illustrated in the drawings, but which is similar as regards its external contours to insert 53 and which has an opening which exposes the cassette chamber cover 11. The inner faces of the body formed by the body shells 3, 4 are then covered all round with inserts, which may be cut out from one piece and correspondingly folded in order to facilitate their insertion in the body shells 3, 4.

Simplicity of fitting of the inserts 51, 52 to the curved insides of the body faces 19, 20 of the body shells 3, 4, including the body projections 25, 29, is facilitated by fashioning the contours of these body projections 25, 29 so that the longitudinal edges of the step faces 24, 25 and 28 on the side towards the body faces 19 and 20, respectively, and the longitudinal edges of these step faces on the side towards the curved faces of the body projections 25, 29, are each of equal length in a developed view. It is therefore sufficient to provide cuts of corresponding length or narrow slits of corresponding length on the inserts 51, 52, so that the region of the respective insert on one side of the respective cut or slit can fit against the inner face of the respective body shell 3, 4, and the region on the other side of the respective cut or slit can fit against the inner face of the respective body projection 25, 29, without this resulting in undesirable distortions of the insert in this region. In FIG. 5, for example, a cut or slit 59 is shown on the insert 51, which cut or slit corresponds in a developed view to the length of each of the two longitudinal edges of the associated body step 24, so that the regions of the insert 51 which adjoin the cut or slit 59 can curve outwards in opposite directions, so as to fit firstly against the inwardly curved inner face of the body shell 3 and secondly against the outwardly curved inner face of the body projection 25 also. A similar design is also provided on the other body steps 25 and 28, without this being illustrated in the drawings.

The construction of the body shells 3, 4, including the associated body projections 25, 29, from transparent plastic, and the inserts 51, 52 and 53 made of printed cardboard or the like which are placed behind or underneath their inner faces, also result in the advantage that when disposable cameras are packaged with films of different types (e.g. colour negative or colour transparency film) and/or of different sensitivity to light, the important information for the user as regards the film inserted in each case can be reproduced extremely simply on one or more of the inserts 51, 52, 53, so that this information can easily be read from the outside, by the sales personnel on the sale of a camera such as this and later by the user when the camera acquired is used, through the body shell 3 and/or 4. Moreover, as a result of its arrangement on the inside of the respective transparent body shell, this information even remains unimpaired if the camera is exposed to moisture or to other unfavourable conditions during rough handling. Furthermore, cameras of the type described above can be differently adapted in a simple manner, even when they are also of identical engineering construction, to the desires and requirements determined by the tastes of different circles of people who acquire and use these cameras, by means of an appropriate graphical or ornamental form of the printed faces of the inserts 51, 52, 53. It is just as easy to adapt the information communicated on and the aesthetic form of the inserts to different, e.g. seasonal, purposes of use of the respective cameras.

In the embodiments described above, the camera is equipped by the manufacturing or packaging concern, even before delivery to the trade, with an unexposed roll film of a suitable type of packaging, in such a way that the film, the film end of which is fixed to a film spool, which is not illustrated, of a film cassette 6, is inserted in the central subassembly 1 so that the film cassette 6 is introduced into the film cassette chamber 5 of the central subassembly 1 and a loose film roll, which corresponds almost to the entire length of the film strip, is accommodated by the film roll chamber 7 of the central subassembly 1. The film roll chamber 7 with the film roll contained therein forms the film supply side when the camera is subsequently employed by the user to take photographs. When the camera is used to take photographs, the film is pulled step-wise over the image aperture 9 by the user, by operating the film advance wheel 10 of the central subassembly 1, is exposed in the image aperture, and is wound into the film cassette 6, where it is wound on the film spool contained therein.

As has already been described above in detail, after the last photograph has been taken the camera is transferred, as a whole and unopened by the user, to a developing organisation. There the central subassembly 1 is exposed by tearing open the covering of the cassette chamber cover 11, whereupon the film cassette 6 is removed from the film cassette chamber 5 of the central subassembly 1 by opening this cover. A film opening, which is not illustrated, of the film cassette 6, is either intrinsically light-tight or is automatically closed before the cassette chamber cover 11 is opened, so that the film which is wound into the film cassette 6 is not exposed to ambient light when the film cassette is removed from the camera and is thus not damaged during its removal from the camera.

Since only the cassette chamber cover 11 has to be opened in order to remove the film cassette with the exposed film contained therein from the camera, and the body shells 3, 4 remain closed, the intermediate storage and return to the manufacturing or packaging concern of the remainder of the camera after the removal of the film cassette can be effected without opening the body shells 3, 4, so that the relatively sensitive and comparatively expensive central subassembly 1 also advantageously remains protected from mechanical damage during the intermediate storage and return of the empty cameras which arise in the developing organisation, even if these empty cameras are treated as bulk material.

For the subsequent reconditioning of the returned empty cameras, the body shells 3, 4 can be removed from each other in the manufacturing or packaging concern by completely pulling off the connecting band 47 from the channel 46 of the body 2 and taking out the central subassembly 1, so that the body shells 3, 4 and the central subassembly 1 can be checked individually for reusability for a camera which is to be freshly packaged with a film. If parts of this type are no longer suitable for reuse, they are fed to a recycling process.

The construction of the indentations 60, 61, 62, 63 described above on both sides of the axis of the shooting lens on the front and back side of the body of a camera is also possible and advantageous for cameras of conventional type, in which the insertion of the respective unexposed film in the camera and the removal of the exposed film from the camera are effected by the user in the known manner. The construction of indentations of this type can also be effected in those cameras in which the body is not assembled from front and back body shells 3, 4, but is formed in a conventional manner.

Moreover, the construction described above, which comprises a central subassembly 1 forming a light-tight inner body, and a surrounding outer protective body 2 comprising front and back body shells 3, 4, with the facility of removing the film without opening the outer body, is also possible for non-disposable cameras of the aforementioned type, particularly when provision is made for the use of a film cassette which, before the exposed film is rewound into the film cassette, also enables the still unexposed film to be unwound from the film cassette simply by rotating the film of the film cassette in the opposite direction, as is possible with the aforementioned "Advanced Photo System".

We claim:

1. A camera for roll film suitable for winding into a film cassette comprising (a) a light-tight inner body formed by a central subassembly, the inner body containing a film cassette chamber for accommodating a film cassette, and film guiding means for guiding a film placed in the inner body when the film is transported in a direction toward the film cassette;

(b) an outer body surrounding the inner body and having an opening for removal of the film cassette from the film cassette chamber of the inner body through the opening;

(c) a cassette chamber cover movably arranged close to the opening of the outer body and placed so as to cover the cassette chamber in a light-tight manner;

(d) the outer body having two body shells adapted to be joined to each other at selected edges on each shell; and (e) wherein the opening in the outer body is formed by opposite edge portions of the body shells.

2. A camera according to claim 1 wherein the opposite edge portions of the body shells each are formed by reliefs provided at the edge portions.

3. A camera according to claim 1 wherein the opposite edge portions forming the opening are disposed on bottom parts of the body shells.

4. A camera according to claim 1 wherein the opening is surrounded by sickle-shaped sections of the edge portions disposed on a bottom face of the outer body.

5. A camera according to claim 1 wherein the cassette chamber cover is removably placed on an edge of the film cassette chamber of the inner body.

6. A camera according to claim 1 wherein the cassette chamber cover is swivel-mounted on the inner body by means of a hinge.

7. A camera according to claim 1, wherein the cassette chamber cover is disposed in the opening of the outer body so that the cassette chamber cover terminates flush with a face of the outer body forming the opening.

8. A camera according to claim 1 wherein the body shells when joined to each other, are held together by a surrounding band extending over an outer face of the cassette chamber cover when placed to cover the cassette chamber.

9. A camera according to claim 8 wherein the surrounding band is disposed in a groove jointly formed by the body shells.

10. A camera according to claim 9 wherein the groove jointly formed by the body shells is continued by a groove formed in the outer face of the cassette chamber cover.

11. A camera according to claim 1 wherein the cassette chamber cover has a seal fitted over its outer edge and adapted to be broken for removal of the cassette chamber cover in order to enable removal of the film cassette from the film cassette chamber of the inner body.

12. A camera according to claim 1 wherein the outer body has a second opening adjacent to the opening for removal of the film cassette, the second opening being close to the cassette chamber cover for enabling introducing of a tool for removal of the cassette chamber cover from its closed position.

13. A camera according to claim 1 including a photographic film in the inner body ready for use when the camera is in a condition for delivery to an end user.

* * * * *